(12) United States Patent
Kaiser

(10) Patent No.: US 8,273,486 B2
(45) Date of Patent: Sep. 25, 2012

(54) PROTECTING A PEM FUEL CELL CATALYST AGAINST CARBON MONOXIDE POISONING

(75) Inventor: Mark Kaiser, Prospect Heights, IL (US)

(73) Assignee: Honeywell International, Inc., Morristown, NJ (US)

( * ) Notice: Subject to any disclaimer, the term of this patent is extended or adjusted under 35 U.S.C. 154(b) by 723 days.

(21) Appl. No.: 12/363,526

(22) Filed: Jan. 30, 2009

(65) Prior Publication Data

US 2010/0196780 A1    Aug. 5, 2010

(51) Int. Cl.
*H01M 4/92* (2006.01)
(52) U.S. Cl. ........ 429/407; 429/412; 429/480; 429/481; 502/101; 502/115
(58) Field of Classification Search .................. None
See application file for complete search history.

(56) References Cited

U.S. PATENT DOCUMENTS

| | | | |
|---|---|---|---|
| 6,303,094 B1 | 10/2001 | Kusunoki | |
| 6,309,769 B1 | 10/2001 | Haug | |
| 6,432,177 B1 | 8/2002 | Dallas | |
| 6,630,772 B1 | 10/2003 | Bower | |
| 6,660,383 B2 | 12/2003 | Toyoda | |
| 6,712,864 B2 | 3/2004 | Horiuchi | |
| 6,800,865 B2 | 10/2004 | Nakayama | |
| 6,835,330 B2 * | 12/2004 | Nishino et al. ............ | 252/503 |
| 6,916,434 B2 | 7/2005 | Nishino | |
| 6,923,946 B2 | 8/2005 | Geohegan | |
| 6,969,651 B1 | 11/2005 | Lu | |
| 7,253,431 B2 | 8/2007 | Afzali-Ardakani | |
| 7,438,885 B1 * | 10/2008 | Seal et al. ................ | 423/447.1 |
| 2002/0076586 A1 | 6/2002 | Tanaka | |
| 2004/0151653 A1 | 8/2004 | Ando | |
| 2004/0167014 A1 * | 8/2004 | Yan et al. ................ | 502/101 |
| 2005/0199894 A1 | 9/2005 | Rinzler | |
| 2005/0221149 A1 | 10/2005 | Matsubayashi | |
| 2006/0101943 A1 * | 5/2006 | Snow et al. ............... | 75/252 |
| 2006/0115711 A1 | 6/2006 | Kim | |
| 2007/0195488 A1 | 8/2007 | Kim | |
| 2008/0039557 A1 | 2/2008 | Li | |
| 2008/0248373 A1 * | 10/2008 | Son ........................... | 429/44 |
| 2008/0292927 A1 | 11/2008 | An | |
| 2008/0305374 A1 | 12/2008 | Toro | |
| 2009/0148740 A1 * | 6/2009 | Farag et al. ............... | 429/30 |

FOREIGN PATENT DOCUMENTS

| | | | |
|---|---|---|---|
| WO | WO2004023581 A2 | | 3/2004 |
| WO | WO2004096725 A2 | | 11/2004 |
| WO | WO2007009059 A2 | | 1/2007 |
| WO | WO2007100306 | * | 9/2007 |

* cited by examiner

*Primary Examiner* — Melvin C Mayes
*Assistant Examiner* — Colette Nguyen
(74) *Attorney, Agent, or Firm* — Shimokaji & Assoc., PC

(57) ABSTRACT

An anode structure comprises an array of carbon nanotubes having a diffusion side and a membrane side, and catalyst particles interspersed on inner surfaces of the membrane side of the carbon nanotubes. The carbon nanotubes have an average diameter greater than the size of the hydrogen molecule but smaller than the size of the carbon monoxide molecule. Thus, hydrogen flowing toward the catalyst particles interspersed inside the carbon nanotubes are able to go through, while the flow of trace amounts of carbon monoxide contained in the hydrogen is blocked, preventing the poisoning of the catalyst particles by the carbon monoxide. A fuel cell utilizing the anode structure and a method for manufacturing the anode structure are also disclosed.

9 Claims, 4 Drawing Sheets

PROTECTING A PEM FUEL CELL CATALYST AGAINST CARBON MONOXIDE POISONING

BACKGROUND OF THE INVENTION

The present invention generally relates to an apparatus for protecting the catalyst particles of proton exchange membrane (PEM) fuel cells from poisoning by carbon monoxide, a fuel cell utilizing the apparatus, and a method for manufacturing the apparatus.

Fuel cells use the chemical energy produced in the reaction between hydrogen and oxygen to generate electricity that does not require combustion of fossil fuels and is clean. In a basic configuration of a fuel cell, hydrogen gas flows to the anode on one side of the fuel cell, while air flows to the cathode on the other side of the fuel cell. A platinum catalyst deposited on the anode splits the hydrogen molecule into two positive hydrogen ions (protons) and two negatively charged electrons. A proton exchange membrane (PEM) positioned between the anode and the cathode allows only the positively charged hydrogen protons to pass through it and reach the cathode. The negatively charged electrons travel along an external electrical circuit to the cathode, creating an electrical current. At the cathode, the negatively charged electrons and positively charged hydrogen ions combine with the oxygen typically from an air feed to form water which flows out of the cell.

The platinum catalyst of a fuel cell is susceptible to trace amounts of poisons, most notably carbon monoxide, which are generally present in hydrogen gas manufactured from the reforming of hydrocarbons. Catalyst poisons, such as carbon monoxide bind with the platinum thereby poisoning the electrode and decreasing fuel cell performance over time. Even trace amounts of carbon monoxide as low as 10 ppm can have a detrimental effect on the shelf life of the expensive platinum catalyst.

As can be seen, there is a need for a solution to reduce or eliminate the poisoning of platinum catalysts used for splitting the hydrogen molecule by carbon monoxide.

SUMMARY OF THE INVENTION

In one aspect of the present invention, an anode structure comprises an array of carbon nanotubes having a diffusion side and a membrane side, the carbon nanotubes having an average nanotube diameter and average nanotube length; and catalyst particles interspersed on inner surfaces of the membrane side of the carbon nanotubes.

In another aspect of the present invention, a fuel cell comprises a proton exchange membrane having an anode side and a cathode side; an anode structure having a diffusion side and a membrane side, the anode structure containing an array of carbon nanotubes and catalyst particles interspersed on inner surfaces of the membrane side of the array of carbon nanotubes, the membrane side of the anode structure being disposed in direct contact with the anode side of the proton exchange membrane; a cathode having a membrane side and a diffusion side, the membrane side of the cathode being disposed in direct contact with the cathode side of the proton exchange membrane; a hydrogen-side gas diffusion layer having an anode side and a diffusion side, the anode side of the hydrogen-side gas diffusion layer being disposed in direct contact with the diffusion side of the anode structure; an oxygen-side gas diffusion layer having a cathode side and a diffusion side, the cathode side of the oxygen-side gas diffusion layer being disposed in direct contact with the diffusion side of the cathode; a hydrogen-side bipolar plate having a channel side and a flat side, the channel side of the hydrogen-side bipolar plate being disposed in direct contact with the diffusion side of the hydrogen-side gas diffusion layer; an oxygen-side bipolar plate having a channel side and a flat side, the channel side of the oxygen bipolar plate being disposed in direct contact with the diffusion side of the oxygen-side gas diffusion layer; an external electrical circuit containing an electrical load, the electrical circuit connecting a collecting point on the hydrogen-side bipolar plate to a discharge point on the oxygen-side bipolar plate; a hydrogen-side end plate disposed in contact with the flat side of said hydrogen-side bipolar plate; and an oxygen-side end plate disposed in contact with the flat side of the oxygen-side bipolar plate.

In yet another aspect of the present invention, a method for manufacturing an array of carbon nanotubes for an anode structure comprises growing an array of carbon nanotubes on a silica crystal, the array of carbon nanotubes having a diffusion side, a membrane side, the membrane side having inner surfaces, the carbon nanotubes being characterized by an average nanotube diameter and average nanotube length; dipping the membrane side of the array of nanotubes in a hexachloroplatinum solution; heat treating the array of carbon nanotubes to decompose the hexachloroplatinum into platinum particles and chlorine and to remove the chlorine from the platinum particles in a manner that leaves the platinum particles interspersed on the inner surfaces of the membrane side of the array of nanotubes; exposing the platinum particles to hydrogen to effect a reduction of the platinum particles; and mechanically removing the array of carbon nanotubes from the crystal.

These and other features, aspects and advantages of the present invention will become better understood with reference to the following drawings, description and claims.

DETAILED DESCRIPTION OF THE INVENTION

Figure 1:
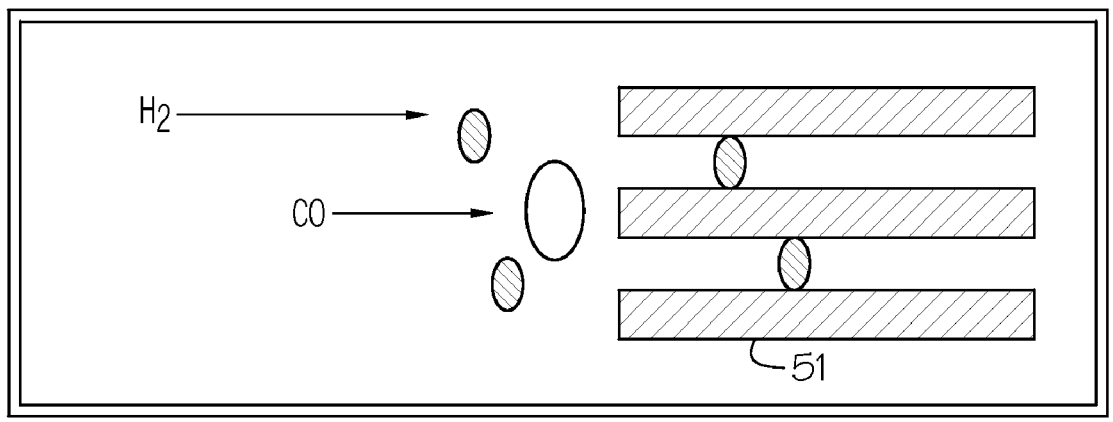
FIG. 1 is a conceptualized illustration of filtering out the carbon monoxide molecules according to an embodiment of the present invention.

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Various inventive features are described below that can be each be used independently of one another or in combination with other features. However, any single inventive feature may not address any of the problems discussed above or may only address one of the problems discussed above. Further, one or more of the problems above may not be fully addressed by any of the features described below.

Broadly, embodiments of the present invention provide for an anode structure for a fuel cell configured to block catalyst poisons, such as carbon monoxide or sulfur dioxide from reaching and contaminating the fuel cell catalyst, a fuel cell containing the anode structure, and a method of manufacturing the anode structure. The anode structure of the present invention contains an array of carbon nanotubes arranged to have a diffusion side and a membrane side and catalyst particles interspersed on the nanotubes' membrane side inner surfaces. The catalyst may be platinum or an alloy of platinum family metals including but not limited to ruthenium and palladium. The average inner diameter of the nanotubes of the present invention must be greater than the size of a hydrogen molecule, which is about 0.29 nm, but smaller than the size of a carbon monoxide molecule, which is about 0.37 nm. A hydrogen gas, having molecules smaller than the nanotubes' average diameter, may flow through the nanotubes, make contact with the catalyst particles and dissociate into hydrogen ions and electrons used to generate electrical power. The carbon monoxide present in the hydrogen, having a larger size than the nanotubes' average diameter, may be prevented from entry into the nanotubes. In one embodiment, the average diameter of the carbon nanotube of the present invention may range from about 0.31 nm to about 0.36 nm. In another embodiment, the average diameter of the carbon nanotube of the present invention may range from about 0.33 nm to about 0.34 nm. The carbon nanotubes may have a single wall structure, a multiple wall structure or be vertically aligned. Carbon nanotubes having these characteristics have been disclosed in U.S. Pat. Nos. 6,835,330 and 6,916,434 that disclose a nested multi-walled carbon tube having mean spacing between hexagonal carbon layers, also referred to as $d_{002}$ spacing, of 0.34 nm or less. U.S. Pat. No. 6,630,772 discloses a nanotube formed by a laser ablation process that was measured having an inter-shell spacing $d_{002}$ of 3.4 Angstrom (equal to 0.34 nm). U.S. Pat. No. 6,869,583 suggests internal pores in a real material have gateways smaller than the kinetic diameter of about 0.36 nm. US pre-grant publication 20070195488 discloses interlayer distances of carbon materials in the range of 0.33-0.36 nm. It is desirable to manufacture the array of nanotubes with an average length that is as low as possible in order to minimize the length the hydrogen molecules need to travel, yet practical to manufacture. The preferred average length of the nanotubes of the present invention may range from about 100 nm to about 100,000 nm.

Referring to FIG. 1, there is shown a conceptualized illustration of a nanotube 51 showing hydrogen molecules going through the nanotubes which have an average diameter larger than the size of the hydrogen molecules. However, a carbon monoxide molecule may be blocked from entering the nanotube as its size is larger than the average nanotube diameter.

Figure 2:
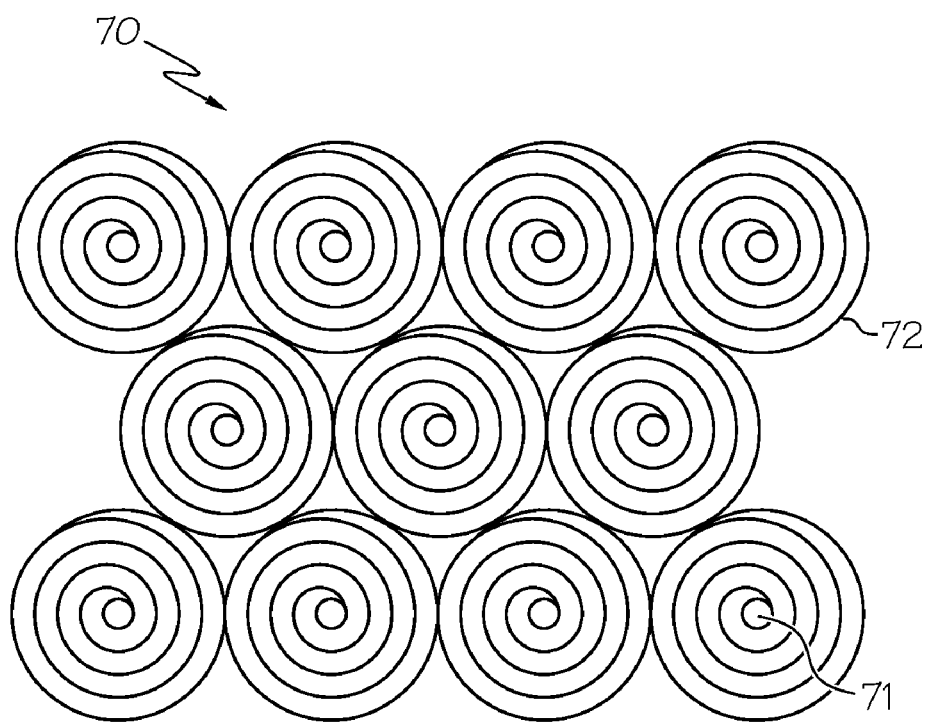
FIG. 2 is a magnified perspective front view of a multi-walled array of carbon nanotubes according to an embodiment of the present invention.

Referring to FIG. 2, there is shown a generalized illustration of a multi-walled array of nanotubes 70 showing rolled up carbon layers 72 having a nanotube 71 in the center.

The fuel cell containing the anode structure of the present invention may be assembled in the form that combines material layers and plates into a vertical assembly. The layers may be stacked and compressed against each other or against the plates to insure close contact between the surfaces.

Figure 3:
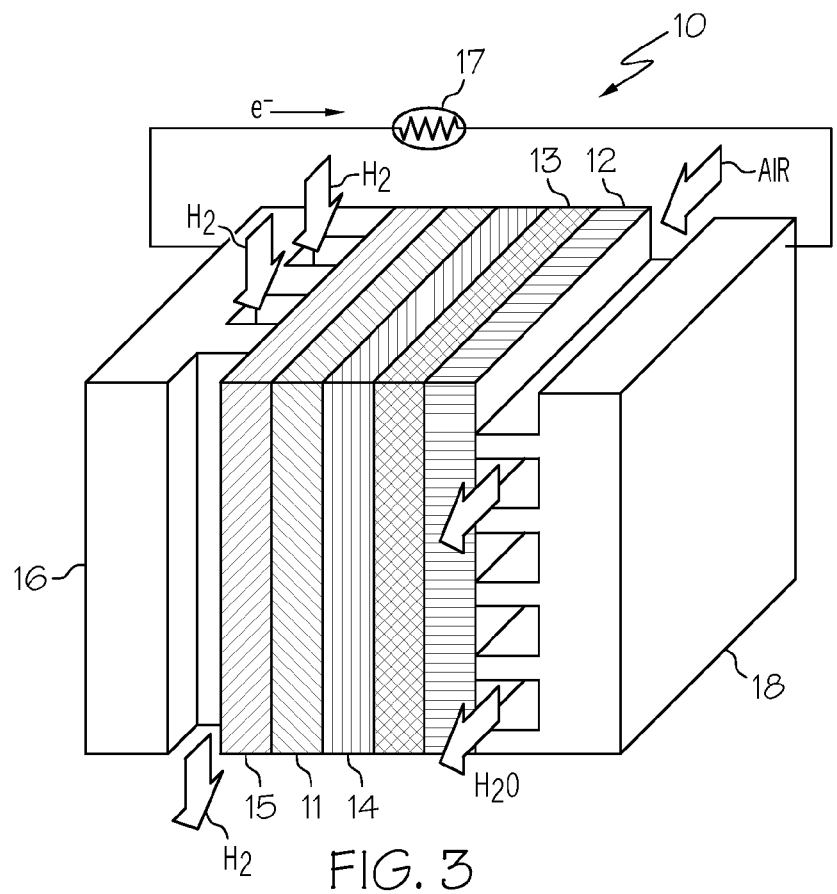
FIG. 3 is a perspective view of a fuel cell according to an embodiment of the present invention.

Referring to FIG. 3, there is shown a front view of one embodiment of a fuel cell 10 according to one embodiment of the present invention including an anode structure 11, a cathode 13, a proton exchange membrane (PEM) 14 disposed between the anode structure 11 and the cathode 13, a hydrogen-side gas diffusion layer 15 placed next to the anode structure 11, an oxygen-side gas diffusion layer 12 positioned against the cathode 13, a hydrogen-side bipolar plate 16 positioned against the hydrogen-side gas diffusion layer 15, and an oxygen-side bipolar plate 18 disposed in contact with the cathode side gas diffusion layer 12. External electrical circuit 17 may connect the hydrogen-side bipolar plate 16 with the oxygen-side bipolar plate 18. The external electrical circuit 17 may contain an electrical load powered by the flow of the electrons such as an electrical appliance or an electric car. The hydrogen-side bipolar plate 16 and oxygen-side bipolar plate 18 may contain channels for distributing the hydrogen and air across the entire surface of the anode structure 11 and cathode 13 respectively.

In a typical operation, hydrogen flows through the hydrogen-side bipolar plate 16 and the hydrogen-side gas diffusion layer 15 which is in contact with the surface of the anode structure containing the catalyst. The hydrogen-side bipolar plate 16 and the hydrogen-side gas diffusion layer 15 help distribute the hydrogen flow over the entire area of the anode structure 11 to fully utilize the catalyst particles. The catalyst particles may react with a hydrogen molecule splitting it into two protons and two electrons:

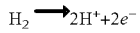

$$H_2 \longrightarrow 2H^+ + 2e^-$$

The hydrogen protons may travel across the proton exchange membrane 14 designed to allow passage only to the positively charged protons and only in one direction toward the cathode 13. The electrons may be generated around the catalyst inside the anode structure 11 and may travel across the array of carbon nanotubes, across the hydrogen-side gas diffusion layer 15 and across the hydrogen-side bipolar plate 16 to reach a collecting point on the hydrogen-side bipolar plate 16 from where they may enter the external electrical circuit 17. Thus, the array of carbon nanotubes, the hydrogen-side gas diffusion layer 15 and hydrogen-side bipolar plate 16 should exhibit sufficient conductivity to allow the electrons to flow freely through these layers. Likewise, the oxygen-side bipolar plate 18 and gas diffusion layer 12 should be sufficiently conductive to enable the electrons to reach the cathode and combine with the oxygen from the air and hydrogen protons that reach the cathode through the proton exchange membrane to form water which flows out of the fuel cell as follows:

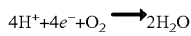

$$4H^+ + 4e^- + O_2 \longrightarrow 2H_2O$$

To perform their functions properly, the gas diffusion layers may be made of a porous material composed of a dense array of carbon fibers, which provides an electrically conductive pathway for current collection and helps provide a pathway for excess water removal. The materials of construction for bipolar plates may include graphite, graphite composites, and stainless steel and other metals. The proton exchange membrane may be made of a thin fluoropolymer, such as DuPont's Nafion® that will allow hydrogen protons to pass through. The end plates may be made from aluminum, titanium, or stainless steel alloys, while the cathode's material of construction may be graphite.

Figure 4:
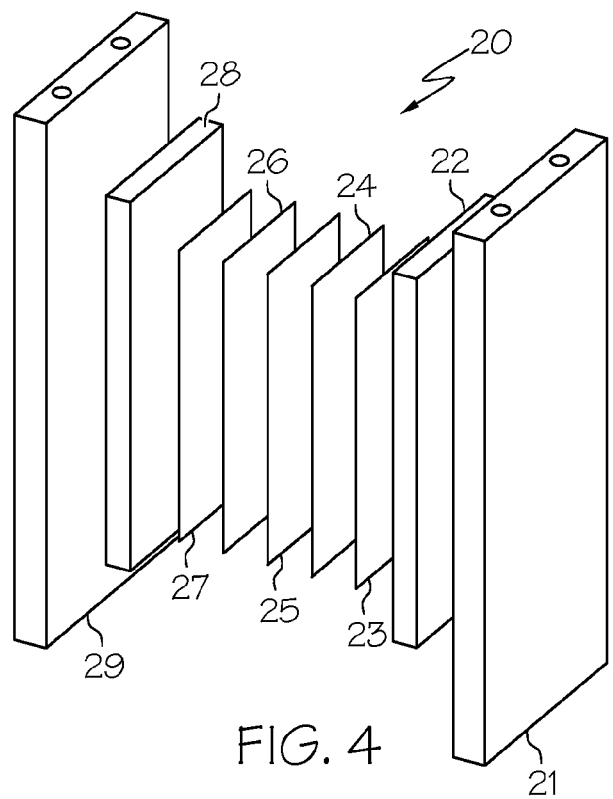
FIG. 4 is an exploded view of a fuel cell according to an embodiment of the present invention.

Referring to FIG. 4, there is shown an exploded view of the components of the fuel cell 20 according to an embodiment of the present invention including a cathode-side end plate 21, a cathode-side bipolar plate 22, a cathode-side gas diffusion layer 23, a cathode 24, a proton exchange membrane 25, an anode structure 26, a hydrogen-side gas diffusion layer 27, an anode-side bipolar plate 28, and an anode-side end plate 29. The end plates 21 and 29, also referred to as separator plates, may provide mechanical structure support for the fuel cell and act as a barrier to contain the hydrogen and oxygen. The end plates 21 and 29 may also separate multiple cells connected in series.

The fuel cell according to an embodiment of the present invention may optionally include a cooling system, such as a cooling plate, to maintain component temperatures in the proper range of about 80° C., and a moisture control system for the proton exchange membrane. The cooling system of the present invention may be manufactured according to the embodiment of a cooling system disclosed in US Pre-grant publication number 20050221149. The moisture control system of the fuel cell of the present invention may be manufactured according to the embodiment of a moisture control device disclosed in US Pre-grant publication number 20080292927.

Figure 5A:
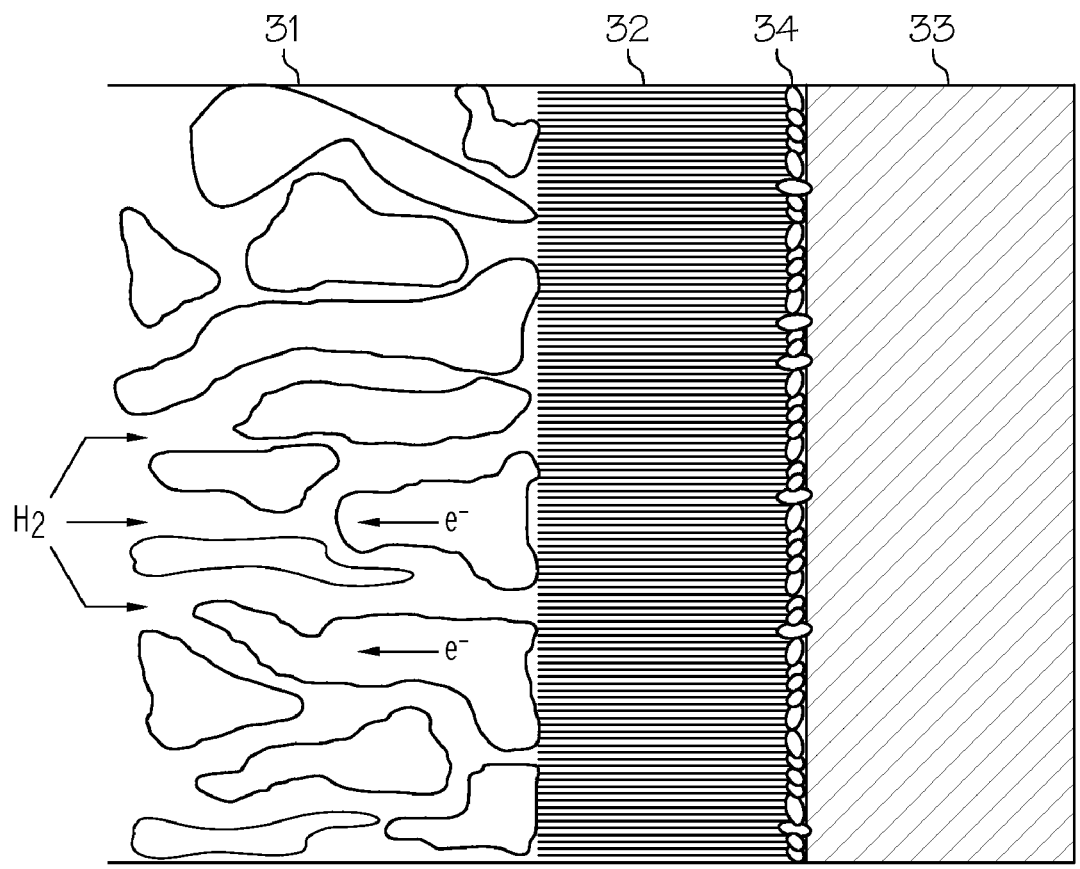
FIG. 5A is a magnified perspective view of the hydrogen-side diffusion layer, the anode structure and the proton exchange membrane of FIG. 3 according to an embodiment of the present invention.
Figure 5B:
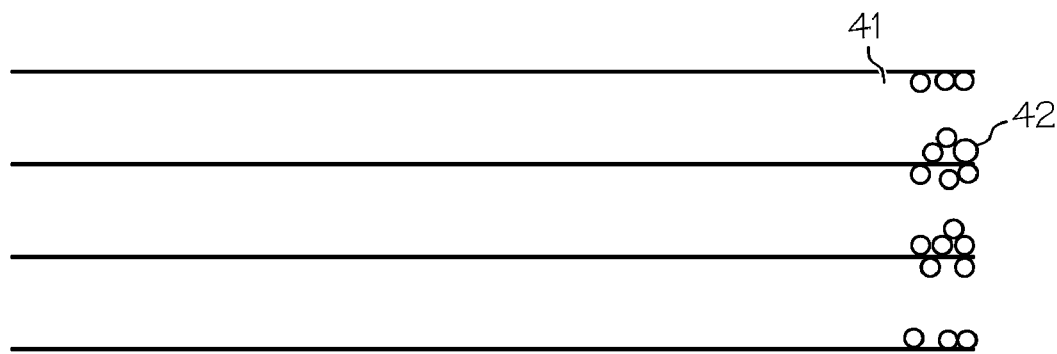
FIG. 5B is magnified perspective view of the anode structure of FIG. 5 according to an embodiment of the present invention.

Referring to FIG. 5, there is shown an illustration of an embodiment of the anode structure 32 according to an embodiment of the present invention disposed between a hydrogen-side gas diffusion layer 31 and a proton exchange membrane 33. The hydrogen-side gas diffusion layer 31 may be porous and configured to contain channels for distributing the hydrogen across the entire area of the anode structure. The catalyst particles 34 are shown positioned at the end closest to the membrane 33. In one embodiment of the present invention, the anode structure may be disposed next to and in intimate contact with the proton exchange membrane 33. In another embodiment of the present invention, the membrane side of the anode structure containing the catalyst may be bonded to the membrane 33 by a process of pressing. The pressing procedure, as known in the art, typically requires pressing with a platen heated to about 120° C. at pressures ranging from about 80 lbs to about 200 lbs.

Referring to FIG. 5A, there is shown a magnified perspective view of the anode structure of FIG. 5 shown containing catalyst particles 42 interspersed on inner surfaces of the nanotube membrane side 41.

Figure 6:
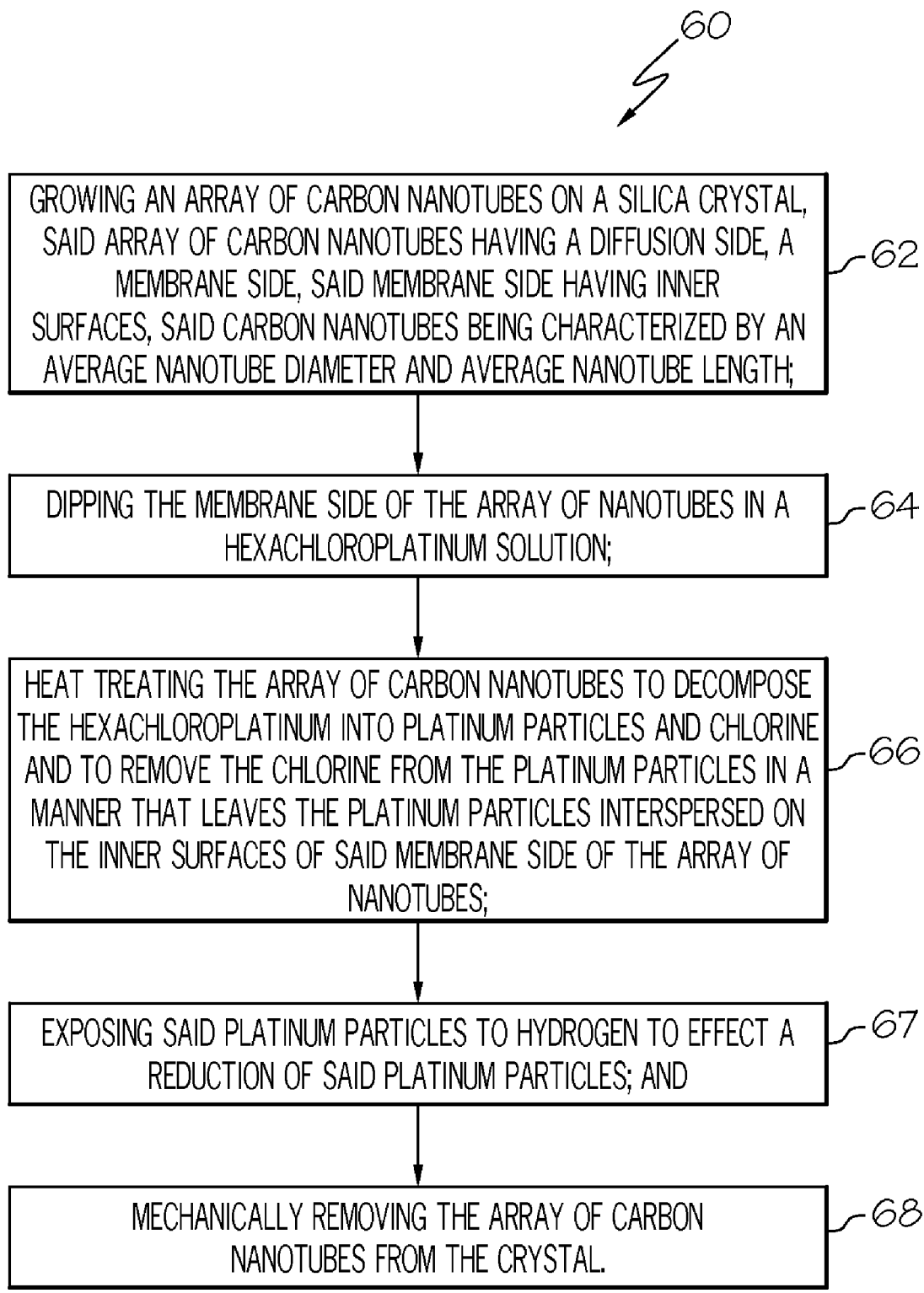
FIG. 6 is a flow chart showing a method according to an embodiment of the present invention.

Referring to FIG. 6, there is shown a flow chart depicting a method 60 according to the present invention. Step 62 may include growing an array of nanotubes on a silica crystal, the array of nanotubes having a diffusion side and a membrane side, the membrane side having inner surfaces. Step 64 may include dipping the membrane side of the array of nanotubes in a hexachloroplatinum solution. Dipping the membrane side in the hexachloroplatinum may have the effect of concentrating the catalyst particles on the membrane side of the array of nanotubes. Step 66 may include heat treating the array of carbon nanotubes to decompose the hexachloroplatinum into platinum particles and chlorine, in the form of hydrochloric acid, and to remove the chlorine from the platinum particles in a manner that leaves the platinum particles interspersed on the inner surfaces of the membrane side of the array of nanotubes. The heat treatment of the array of carbon nanotubes may be carried out at about 400° C. Step 67 may include exposing the platinum particles to hydrogen to effect a reduction of the platinum particles and step 68 may include mechanically removing the array of carbon nanotubes from the crystal.

It should be understood, of course, that the foregoing relates to exemplary embodiments of the invention and that modifications may be made without departing from the spirit and scope of the invention as set forth in the following claims.

I claim:

1. An anode structure comprising:
   an array of carbon nanotubes having a diffusion side and a membrane side, said carbon nanotubes having an average nanotube inner diameter and an average nanotube length, wherein the average nanotube inner diameter is greater than the size of a hydrogen molecule but smaller than the size of a carbon monoxide molecule; and
   catalyst particles interspersed on inner surfaces of said membrane side of said carbon nanotubes.

2. The anode structure of claim 1, wherein said catalyst particles comprise platinum.

3. The anode structure of claim 2, wherein said catalyst particles further comprise ruthenium and palladium.

4. The anode structure of claim 1, wherein the average nanotube inner diameter is in a range of about 0.31 nm to about 0.36 nm.

5. The anode structure of claim 4, wherein the average nanotube inner diameter is in a range of about 0.33 nm to about 0.34 nm.

6. The anode structure of claim 1, wherein the average nanotube length ranges from about 100 nm to about 100,000 nm.

7. The anode assembly of claim 1 wherein said array of carbon nanotubes comprises vertically aligned nanotubes.

8. The anode assembly of claim 1 wherein said array of carbon nanotubes comprises single-walled nanotubes.

9. The anode assembly of claim 1 wherein said array of carbon nanotubes comprises multi-walled nanotubes.

* * * * *